July 23, 1929. H. A. HOLZER Re. 17,380

LONG WALL CONVEYER

Original Filed Aug. 4, 1924 2 Sheets-Sheet 1

INVENTOR
Hiram A. Holzer.
BY
ATTORNEY

July 23, 1929. H. A. HOLZER Re. 17,380

LONG WALL CONVEYER

Original Filed Aug. 4, 1924 2 Sheets-Sheet 2

INVENTOR
Hiram A. Holzer.
BY Arthur C. Brown
ATTORNEY

Reissued July 23, 1929. Re. 17,380

UNITED STATES PATENT OFFICE.

HIRAM A. HOLZER, OF PITTSBURG, KANSAS, ASSIGNOR TO UNITED IRON WORKS, INC., OF KANSAS CITY, MISSOURI, A CORPORATION OF MISSOURI.

LONG-WALL CONVEYER.

Original No. 1,571,009, dated January 26, 1926, Serial No. 729,959, filed August 4, 1924. Application for reissue filed December 31, 1926. Serial No. 158,352.

This invention relates to conveyers of the kind that are used in mines for conveying the mined material from the point at which it was removed from the earth to the cars used to carry said material out of the mine.

One object of the invention is to provide a highly efficient conveyer of the type commonly referred to as "long wall conveyers" that can be used successfully in very shallow mineral veins.

Another object is to provide a long wall conveyer that is particularly adapted for use in shallow vein coal mines, due to the fact that it is of such construction that it will convey friable or brittle coal a considerable distance with less liability of breakage than the conventional long wall conveyer.

Another object is to provide a long wall conveyer having the desirable characteristics above described, which is of such construction that the length of the conveyer can be easily changed.

Figure 1 of the drawings is a sectional view, illustrating my improved conveyer arranged in operative position in a mine.

I have herein illustrated my invention embodied in a long wall conveyer that is particularly adapted for use in shallow vein coal mines for conveying coal from the point where it has been undercut and shot loose to the cars in the main entrance of the mine in which the coal is transported out of the mine.

Figure 1:
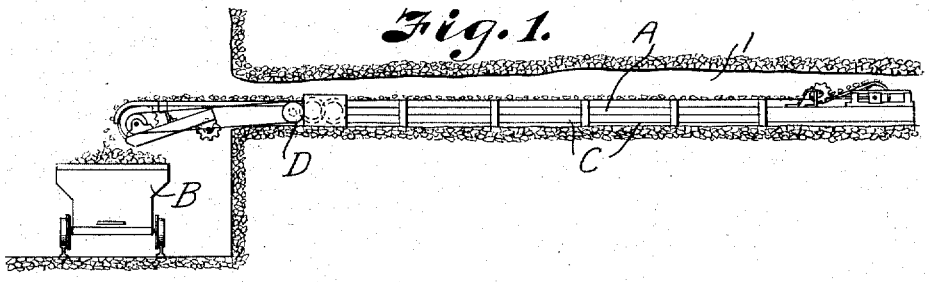
Figure 2:
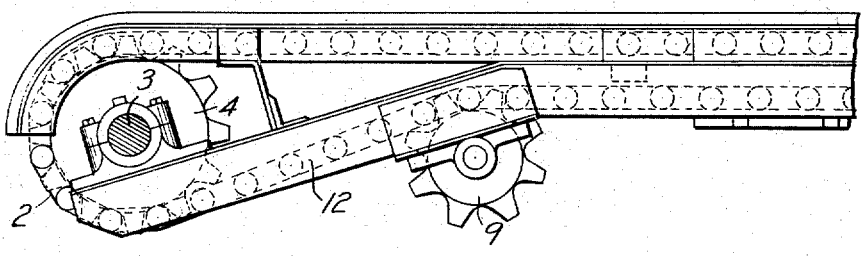
Figure 2 is an enlarged side elevational view of the delivery end portion of said conveyer.

In Figure 1 of the drawings 1 designates a tunnel or passageway of relatively slight depth formed in a shallow or thin vein of coal. A designates as an entirety my improved conveyer which is arranged in said tunnel and B designates a mine car in the main entrance of the mine into which the coal is discharged from the conveyer A, said conveyer extending from the face of the vein to a point in proximity to the place where the coal is being mined or removed from the earth. One of the distinguishing characteristics of my improved conveyer is that it is shallow enough to be used successfully in a relatively thin vein of coal. Another distinguishing characteristic is that it comprises a plurality of endless chains of relatively small pitch, say, for example, a five inch pitch on which the coal is carried to the point of discharge, thus reducing breakage of the coal to a minimum. And still another novel characteristic of the conveyer is that the housing in which the chains travel is built up of a number of sections detachably connected together, thereby enabling the length of the conveyer to be easily increased or decreased.

Figure 4:
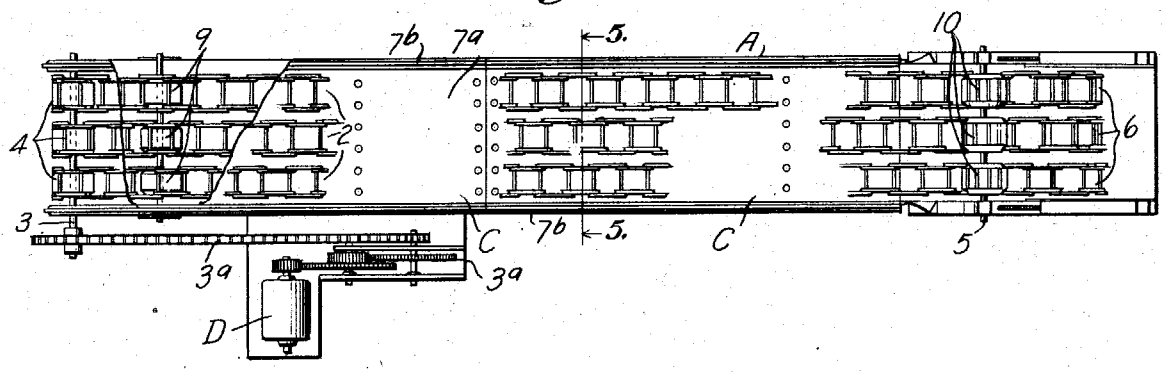
Figure 4 is a top plan view of the conveyer, partly broken away, so as to illustrate the construction of the same.
Figure 5:
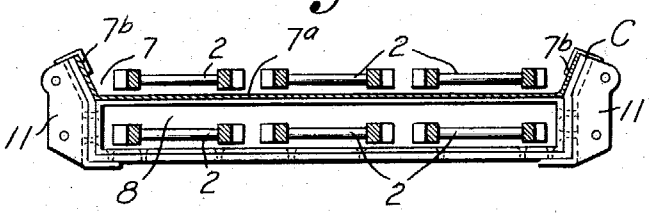
Figure 5 is a transverse sectional view, taken on the line 5—5 of Figure 4.

In the drawings which illustrate the preferred form of my invention, 2 designates a plurality of endless chains, preferably chains having a relatively small pitch, 3 designates a drive shaft at the discharge end of the conveyer provided with drive sprockets 4 around which the chains 2 travel, 5 designates a shaft arranged transversely of the conveyer at the receiving end of same and provided with idler sprockets 6 around which the conveyer chains travel, and C designates as an entirety a housing for the chains constructed in the form of two superimposed troughs 7 and 8 through which the top and bottom portions of the chains travel. Any suitable means can be used for operating the drive shaft 3, such, for example, as an electric motor D operatively connected with said drive shaft by a driving mechanism designated as an entirety in Figure 4 by the reference character $3^a$. In order to produce a conveyer that can be operated efficiently with a minimum expenditure of power, and whose dimensions are small enough to permit it to be used successfully in a shallow vein of coal, I use drive sprockets 4 and idler sprockets 6 of relatively great diameter and make the housing C comparatively shallow or of a depth less than said sprockets, the top and bottom portions of the chains being brought together adjacent the ends of the troughs 7 and 8 in said housing by means of guide sprockets 9 arranged behind the drive shaft 3 on the underside of the conveyer and guide sprockets 10 arranged in front of the idler sprockets 6 at the upper side of the conveyer. In most instances the chain housing C will comprise a shallow bottom trough 8 provided with a solid bottom wall over which the return flights of the chain drag and a top trough 7 provided with a flat, solid bottom wall $7^a$ and inclined or flared side walls $7^b$, as shown in Figure 5, the bottom and side walls of said troughs being formed from sheet metal. The chain housing C as an entirety is constructed in sections so as to enable the length of the conveyer to be changed easily by increasing or decreasing the number of sections of the chain housing and increasing or decreasing the length of the conveyer chains 2 and while the particular details of construction of the chain housing are immaterial each section of the housing is preferably made up of a framework that carries shallow pans which act as troughs for the chains, and said sections will be arranged end to end and connected together by bolts or other suitable fastening devices arranged in laterally-projecting flanges 11 at the ends of said sections, as shown in Figure 5.

Figure 3:
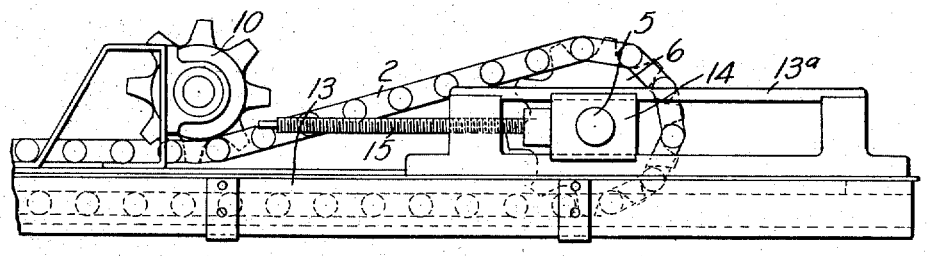
Figure 3 is a side elevational view of the receiving end portion of the conveyer.

The drive sprockets 4 and the guide sprockets 9 arranged adjacent same are carried by a supporting structure, designated as an entirety by the reference character 12, which is attached to one end of the chain housing, and the idler sprockets 6 and guide sprockets 10 arranged adjacent same are carried by a supporting structure, designated as an entirety by the reference character 13 in Figure 3, that is attached to the inner end of the chain housing. Preferably, the supporting structure 13 is provided with guideways $13^a$ that receive adjustable blocks 14 which carry the shaft 5 that supports the idler sprockets 6, said blocks being adapted to be adjusted longitudinally of the guideways $13^a$ by manipulating adjusting screws 15 so as to take up the slack in the conveyer chains.

In operating the conveyer the coal or other mineral, as it is removed from the earth, is deposited on the top portions of the conveyer chains at a point in front of the guide sprockets 10 and is carried by the chains 2 longitudinally of the top trough 7 and discharged into the mine car B located adjacent the discharge end of the conveyer. Owing to the fact that the coal is carried by the conveyer chains through the top trough of the chain housing, instead of being dragged by said chains over the bottom of said trough, coal that is friable or brittle can be transported a considerable distance with minimum breakage. The main advantage of the conveyer, however, is that the chain housing of same is low enough to enable it to be used successfully in a shallow or thin vein of coal, it being possible to construct the chain housing in the form of two relatively shallow, superimposed troughs, due to the fact that the conveyer chains, after passing around the drive sprockets and idler sprockets, are brought together by the guide sprockets 9 and 10 arranged at the opposite ends of said troughs. The above described features coupled with the fact that the length of the chain housing can be easily varied, makes my improved conveyer particularly adapted for use in "low coal" where it is impossible to work the coal with the "room and pillar" system.

Having thus described my invention, what I claim as new and desire to secure by Letters Patent is:

1. A long wall conveyer for mines, comprising a chain housing made up of a number of sections detachably connected together and each comprising two superimposed, shallow, troughs provided with solid bottoms, a plurality of endless conveyer chains of relatively small pitch arranged to support and convey the material through the top trough of the housing and to return through the bottom trough of the housing, driving sprockets and idler sprockets at the ends of said housing around which said chains travel, the diameter of said sprockets being greater than the depth of said chain housing, and guide sprockets arranged adjacent said driving sprockets and idler sprockets and disposed so as to hold the top and bottom portions of the chains in substantially parallel relationship at the opposite ends of the chain housing.

2. A long wall conveyer for mines, comprising a chain housing made up of a number of sections, each of which comprises two superimposed, shallow metal troughs, laterally-projecting flanges at the ends of said sections, fastening devices passing through said flanges for detachably connecting them together, a plurality of endless conveyer chains of relatively small pitch arranged to support and convey the material through the top trough of the housing and return through the bottom trough, drive sprockets at one end of said housing around which the chains travel, idler sprockets at the opposite end of the housing around which said chains travel, means for adjusting one of said groups of sprockets longitudinally of the housing to take up the slack in the chains, and guide sprockets disposed so as to hold the top and bottom portions of the chains in substantially parallel relationship at the ends of said housing.

3. In a long wall conveyer for mines, a chain housing comprising two superimposed shallow troughs provided with solid bottoms, a conveyer including an endless chain of relatively small pitch arranged to support and convey material through the top trough and to return through the bottom trough, sprockets including a driving sprocket at the delivery end and an idling sprocket at the receiving end of the housing on which said chain travels, the diameter of the driving sprocket being greater than the depth of said chain housing, and a guide sprocket arranged adjacent said driving sprocket at the under side of the conveyer to bring the bottom portion of the chain in substantially parallel relationship with the top portion thereof at the end of the lower trough adjacent said driving sprocket.

In testimony whereof I affix my signature.

HIRAM A. HOLZER.